Feb. 15, 1927.
H. R. POSCH
1,617,722
FOCUSING ATTACHMENT FOR MICROSCOPES
Filed Aug. 20, 1919
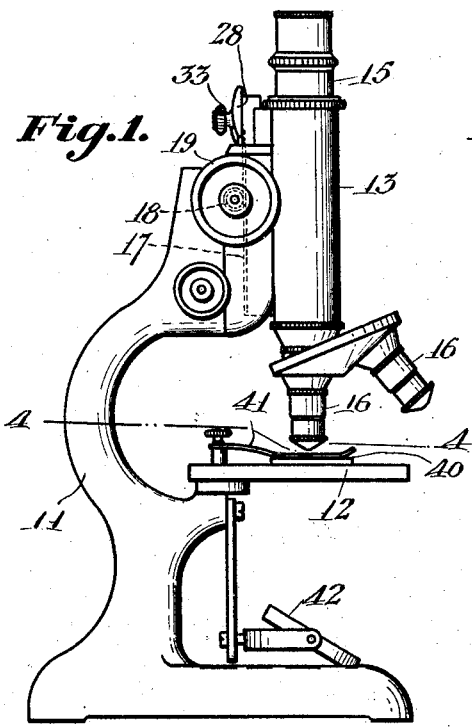
INVENTOR.
Henry R. Posch.
BY Graham & Harris
ATTORNEYS Patented Feb. 15, 1927.

1,617,722

UNITED STATES PATENT OFFICE.

HENRY R. POSCH, OF LOS ANGELES, CALIFORNIA.

FOCUSING ATTACHMENT FOR MICROSCOPES.

Application filed August 20, 1919. Serial No. 318,819.

My invention relates to microscopes and more particularly to an attachment for such instruments by means of which the focusing operation may be quickly and safely accomplished.

It is well known that a novice in the use of microscopes, such as a student, and even in many instances an experienced operator, has difficulty in bringing the instrument to focusing position and it often results that the objects or plates placed upon the stage of the microscope for examination are damaged or destroyed. This is due to the fact that in operating the coarse adjustment commonly found on microscopes the shiftable parts of the instrument move quite rapidly and the focusing point may be passed in which case further downward movement of the shiftable part of the instrument brings the same into contact with the object on the stage. Microscopes, as commonly made, permit a bringing down of the objectives below the focusing point with the coarse adjustment which movement of the shiftable part brings the objective to a point close above the object upon the stage and further downward movement of the objective by the finer adjustment may also damage the object.

The principal object of my invention is to produce a device which may be attached to the common forms of microscopes by means of which the relative movement between the stationary and shiftable parts of the microscope is limited to a point where the instrument is approximately in what may be termed focusing position.

Another object of my invention is to provide an attachment for microscopes which prevents the instrument passing the focusing position during manipulation of either the coarse or finer adjustment of the instrument.

Another object is to arrange the microscope so that adjustment of the instrument by means of the coarse adjustment is governed by mechanical means and is not dependent upon observation through the instrument by the operator.

Another object is to provide focusing means for a microscope by means of which damage to sensitive objects or slides is eliminated.

Another object is to provide a focusing atttachment for microscopes of simple form and construction which may be readily attached to common forms of microscopes in use.

Other objects and advantages will appear hereinafter from the following description and reference to the drawings.

Referring to the drawings, which are for illustrative purposes only—

Fig. 1 is a side elevation of a microscope embodying a form of my invention.

Fig. 2 is an enlarged rear elevation of the upper end of the instrument shown in Fig. 1.

Fig. 3 is an enlarged side elevation of the upper portion of the instrument, and, Fig. 4 is a sectional plan view on line 4—4, Fig. 1.

11 designates the microscope frame or stand to which the table or stage 12 is secured in any suitable manner. 13 designates the body tube mounted on the frame 11, the parts just enumerated, to-wit, the frame 11 and stage 12 being hereinafter referred to generally as the stationary part of the microscope. Slidably mounted in the body tube 13 is a draw tube 15 of common form and construction. The body tube 13 has mounted on the lower end thereof the objectives 16. Secured to the body tube 13 is a rack 17 which meshes with a pinion 18 mounted upon a shaft and operated by the turning knobs or heads 19, such construction being of common form and not shown in detail in the drawings. The body tube, objectives and rack just referred to are, for the purpose of this application, referred to generally as the shiftable or movable part of the microscope in relation to the stationary part hereinabove referred to.

After the microscope has been brought to an approximate focus by the coarse adjustment mechanism heretofore referred to a finer adjustment is ordinarily required to obtain the clearest vision, such adjustment being made to meet the requirements of the eyesight of the observer, and the slight variation in the thickness of the object. This finer adjustment may be made by means of the ordinary fine adjustment mechanism commonly found on microscopes and operated by a knurled head 22 operating on a tube 23. The tube is shown as marked with a scale 24 which registers with the edge 25 of the head 22. The beveled edge 25 is also shown as provided or marked with a scale 26 which when read with a line 27 on the tube 23 gives a micrometer reading of the finer adjustment made.

The focusing attachment consists of a cam or rotatable stop 28 rotatably mounted on a pin or stud 29 the inner reduced end 30 of which is threaded into a threaded hole in the upper end of the rack 17. A shoulder 31 on the stud 29 abuts against the face of the rack and a head 32 on the stud 29 is received in a recess formed in a knurled head 33 formed on the cam 28 and by means of which the cam is rotated on the stud 29. Three objectives 16 may be used; and the cam or stop 28 may be provided with three faces 34, 35 and 36 each a different distance from the center thereof, and it is so mounted on the rack that any one of its faces may come into contact with the upper end of the stand or frame of the microscope and thereby limit the downward movement of the shiftable part of the microscope according to the face of the cam or stop which has been set to engage the stand. A dog 37 is slidably mounted in a bore 38 in the upper end of the rack the pointed end of which is arranged to enter notches 39 formed in the rear face of the cam or stop, there being one notch corresponding to each face thereof. A coiled spring is placed in the bore 38 so that the dog is elastically held in engagement with the notches in the cam or stop so that when it has been rotated or set to the desired position it so remains unless manually operated to another position.

Microscopes are generally used by placing slides for examination indicated at 40 upon the stage 12, being held in position by means of spring fingers 41, light being reflected through the slide by means of a mirror 42 which projects the light through an opening 43 in the stage. Such slides are usually furnished in several thicknesses and a blood counting chamber is also used, such chamber being thicker than the ordinary slides. To focus the instrument properly and quickly I may use a cam or stop with three faces as above described, the face 34 permitting the greatest downward movement of the shiftable part so that an approximate focus is readily obtained by the coarse adjustment for a thin slide, the face 35 permitting a focusing point for slides of medium thickness and the face 36 permitting the least downward movement into focusing position for the blood counting chamber or thickest slide. Analogous results may be obtained in the use of a single slide with a plurality of different objectives having different focal distances.

In either adjustment it is understood that the cam or stop prevents the objectives from coming into contact with the object on the stage; but allowing a quick movement of the shiftable part to the approximate focus for the object. After the approximate focus has been reached by the coarse adjustment the finer adjustment may be made by operation of the heads 22 as is usually done.

Further means are provided for assisting the operator in the accurate and speedy focusing of the object particularly when using blood counting chambers and similar ruled slides. These means consist of spots placed in the face of the stage. Spots preferably formed of pearl or similar white substance indicated at 44 and 45 are set into the table the spots 44 marking the proper position for the side of the plate or object and the spot 45 marking the proper position of the end of the slide or object so that the operator may quickly place the plate in proper position on the stage with the lined portion of the plate in the axis of the objective.

What I claim is:—

1. In a microscope, a stationary part, a stage on the stationary part arranged to hold objects for examination, a shiftable part, an objective carried on the shiftable part, coarse and fine adjusting means for the shiftable part, and rotatable stop means for limiting the downward movement of the shiftable part producible by the coarse adjustment to bring the objective to a predetermined focusing position.

2. In a microscope, a stationary part, a stage on the stationary part arranged to hold objects for examination, a shiftable part, coarse and fine adjusting means for the shiftable part, a plurality of objectives mounted on the shiftable part, and rotatable stop means for limiting the downward movement of the shiftable part producible by the coarse adjusting means to bring the objectives to a predetermined focusing position according to the particular object there in use.

3. In a microscope, a stationary part, a stage on the stationary part arranged to hold objects for examination, a shiftable part, a plurality of objectives mounted on the shiftable part, and means for mechanically limiting the downward movement of the shiftable part to bring the objectives to focusing position, said means consisting of a cam on the shiftable part having a plurality of faces arranged to engage the stationary part.

4. A focusing attachment for microscopes having a stationary part and a shiftable part with a plurality of objectives mounted thereon, coarse and fine adjusting means for the shiftable part, said coarse adjusting means including a cam on the shiftable part which, during the operation of the coarse adjustment, is arranged to engage the top of the stationary part when the objectives are in approximate focus with the object, said cam having a plurality of faces corresponding to different objects.

5. A focusing attachment for microscopes having a stationary part and a shiftable part comprising a cam on the shiftable part arranged to engage the top of the stationary part when the shiftable part is in approximate focus with the object, said cam having a plurality of faces corresponding to height of different objects arranged to engage said stationary part according to the position of the cam.

6. A focusing attachment for microscopes having a stationary part and a shiftable part comprising an adjustable cam on the shiftble part arranged to engage the top of the stationary part when the shiftable part is in approximate focus with the object, said cam having a plurality of faces corresponding to height of different objects, means for rotatably mounting the cam on the shiftable part of the microscope, and means for yieldingly holding said cam in adjusted position.

7. A focusing attachment for microscopes having a stationary part and a shiftable part comprising a bolt on said shiftable part, a cam rotatably mounted on said bolt, said cam having a plurality of faces corresponding to height of different objects arranged to engage the top of the stationary part according to the rotative position of the cam, and means for yieldingly holding said cam in set position.

8. In a microscope, a stationary part, a shiftable part, a coarse adjustment between the stationary part and the shiftable part, a fine adjustment for the shiftable part, a stage on the stationary part arranged to hold objects for examination, an objective on the shiftable part, and means cooperating with the coarse adjustment for limiting the downward movement of the shiftable part to approximate focusing position with relation to the height of the object on the stage.

In testimony whereof, I have hereunto set my hand at Los Angeles, California, this 13th day of August, 1919.

HENRY R. POSCH.